3,454,417
COLORED REINFORCED LAMINATES
Donald Anthony Pascale, Cherry Hill, N.J., assignor to
E. I. du Pont de Nemours and Company, Wilmington,
Del., a corporation of Delaware
No Drawing. Filed Dec. 29, 1965, Ser. No. 517,466
Int. Cl. B44d 1/14; D21h 1/0
U.S. Cl. 117—73                                    5 Claims

ABSTRACT OF THE DISCLOSURE

Laminated constructions in which a polymethyl methacrylate layer is reinforced by a plastic reinforcing layer containing fibrous materials, e.g., glass fibers, and the plastic reinforcing layer is separated from the polymethyl methacrylate layer by one or more layers of unplasticized lacquer and a barrier layer which serves to inhibit the passage of monomer and the like from the plastic reinforcing layer to the polymethyl methacrylate layer.

---

This invention relates to laminar constructions in which an acrylic layer such as polymethyl methacrylate is reinforced with a reinforcing layer such as polyester and a fibrous reinforcing material. More specifically, this invention relates to laminar constructions in which polymethyl methacrylate is coated on the surface adjacent the reinforcing layer with a color containing composition so as to enhance the beauty and utility of the laminar construction. In particular, this invention relates to laminar construction in which the polymethyl methacrylate layer is separated from the reinforcing layer by a coating or coatings that lend color and stability to the polymethyl methacrylate lamina.

It is known in the art to produce laminar constructions using polymethyl methacrylate lamina, reinforced with glass fiber mats bonded with polymeric resin material. See British Patent No. 904,763, published Aug. 29, 1962 to Moeller. Such laminar constructions are very useful; however, when it is attempted to paint the surface of the polymethyl methacrylate lamina prior to applying the reinforcing material, several problems arise. Specifically, when the surface of the polymethyl methacrylate is painted and then polymeric polyester containing reinforcing material is applied to that surface, stress-solvent crazing occurs.

The aforementioned difficulties may be overcome according to the present invention by employing an unplasticized lacquer selection from the class consisting of modified polymethylmethacrylate lacquers and nitrocellulose lacquers as the coating material (lamina) next to the polymethyl methacrylate layer. The adhesion of the various laminae in the laminate structure is maximized if the unplasticized lacquer is polymethyl methacrylate, and if a second layer of unplasticized lacquer is also employed, and if the second layer is nitrocellulose lacquer, for the polymethyl methacrylate lacquer will adhere better to the polymethyl methacrylate layer than the nitrocellulose lacquer will, and the nitrocellulose lacquer will adhere better to the unpasticized polymethyl methacrylate lacquer better than it will to the polymethyl methacrylate layer, and a subsequently applied layer such as the barrier layer, or the reinforcing layer will adhere better to the nitrocellulose layer than it will to the polymethyl methacrylate layer. Furthermore, the polymethyl methacrylate lacquers tend to give a more aesthetically desirable product when they are used as the coating (lamina) next to the polymethyl methacrylate sheet.

It is critical that unplasticized lacquer be employed as a lamina between the reinforcing layer and the polymethyl methacrylate sheet. If the lacquer is plasticized, monomer and/or solvent materials from the reinforcing layer will eventually penetrate the lacquer and cause the polymethyl methacrylate sheet to stress craze; in addition, the plasticizer apparently migrates into the barrier layer and renders it more permeable to monomer and/or solvents from the reinforcing layer. Unplasticized nitrocellulose lacquer is even more resistant to penetration by solvent materials and monomer than is unplasticized methyl methacrylate lacquer. Therefore, in the preferred embodiment, the polymethyl methacrylate lacquer which may contain pigments and other coloring materials is employed to give good adhesion to the polymethyl methacrylate sheet, and to give the desired aesthetic result, and this lamina is coated with a layer of unplasticized nitrocellulose lacquer to prevent penetration by solvent and/or monomer and subsequent stress-solvent crazing. The nitrocellulose lacquer need not contain pigment or other coloring material. If sufficient care is taken to remove any voids from the reinforcing layer when it is applied, the reinforcing layer may be applied directly to the unplasticized lacquer layer, and a satisfactory product obtained. However, since it is desirable to be able to produce the products of this invention in large quantity in a minimum amount of time, it is advantageous to apply a barrier layer to the surface of the unplasticized lacquer, before the application of the reinforcing layer. This barrier layer may be of the same chemical composition as the reinforcing layer, except that it will be free of any fibrous reinforcing materials. Suitable barrier layers include nylon copolymers, ammoniated methyl methacrylate-glycidyl methacrylate copolymers, polymethyl methacrylate polyester-styrene mixtures and the like. Preferably, the barrier layer contains fillers and/or pigments; these serve to decrease the shrinkage of the barrier layer during curing. The barrier lamina need not be entirely impermeable to monomers or solvent that may be present in the reinforcing lamina, for the unplasticized lacquer lamina will satisfactorily serve to keep monomer and/or solvent from reaching the polymethyl methacrylate sheet except when the monomer and/or solvent is of a substantial concentration. The barrier layer thus may serve to entirely block the passage of monomer and/or solvent, or it may serve merely to diffuse monomer and/or solvent that is trapped or collects in voids in the reinforcing layer.

The reinforcing layer may be any one of many well known plastic materials. Polyesters obtained by the reaction of maleic acid or anhydride, propylene or ethylene glycol and phthalic acid or anhydride, are highly satisfactory. Also polymer-in-monomer solutions of polymethyl methacrylate dissolved in methyl methacrylate monomer, as described in British Patent 870,191, issued to Calkins et al. on Oct. 4, 1961, are highly useful.

The reinforcing resin should contain from 10 to 8% by weight fibrous material. Various fibers, such as glass, sisal, hemp, asbestos, nylon, acrylic fibers made from acrylonitrile or polypropylene, are highly satisfactory.

A suitable method for the application of the reinforcing layer is a roving gun having a dual head and a chopper. Such a system is more fully described in United States patent application, filed by Robert Allen Maginn on May 6, 1963, Ser. No. 278,231, now abandoned.

In most instances the polymethyl methacrylate sheet will be between 5 and 125 mil, the unplasticized lacquer layer or layers between 1 and 5 mil, the barrier layer between 1 and 10 mil, and the reinforcing layer between 10 and 200 mil.

In the following examples all parts and percentages are in parts by weight unless otherwise specified.

Example I

A 40 mil extruded sheet of polymethyl methacrylate was heated by infrared lamps until it was soft and pliable. The sheet was molded by vacuum forming on a mold which had the shape of an automobile fender. The molded sheet was cooled and painted on the surface that had been next to the mold, with a commercially available unplasticized nitrocellulose lacquer, comprising titanium dioxide pigment, cellulose nitrate, methyl ethyl ketone, and methyl alcohol. After drying, this layer was about 1 mil thick. The lacquer film was then sprayed with a nylon coating composition, consisting essentially of 8 parts of a copolymer produced by the method set forth in Example III of U.S. Patent 2,467,186 issued Apr. 12, 1949 to T. Cairns, which copolymer contains 35.5 parts hexamethylenediammonium adipate, 26.5 parts hexamethylene-diammonium sebacate, and 38 parts caprolactam; and 2 parts of the epoxy monomer resulting from the reaction of epichlorohydrin and bisphenol A, dissolved in 45 parts methanol and 45 parts trichloroethylene. This film was dried and formed a tough layer 3 mil thick. The reinforcing layer about 100 mil thick was then applied using a dual head roving gun having a chopper. Glass fibers and a polyester made by reacting maleic acid (2 parts), propylene glycol (1 part), and phthalic anhydride (1 part) at 300° F. for 8 hours, and then mixed with styrene monomer in a ratio of 70 parts polyester to 30 parts styrene, were applied. One head of the dual head roving gun fed the polyester resin containing methyl ethyl ketone peroxide in the amount of 2% by weight, and the other head fed polyester resin containing cobalt naphthenate in the amount of .5% by weight. The chopper was fed with a continuous glass roving (60 strands per fiber and 204 filaments per strand—each filament had a diameter of 0.00035 inch) which it cut into 2-inch lengths. The feed of glass roving was regulated so that about 30% by weight of the reinforcing layer was glass fiber. The air was removed from the reinforcing layer by compression rolling and the reinforcing layer allowed to cure at room temperature for 8 hours. The resulting laminate was completely free of crazing and readily withstood heavy blows with a hammer.

Examples II

A molded sheet made by the process of Example I was painted on one surface with an unplasticized methyl methacrylate lacquer containing pigment and produced in accordance with U.S. Patent No. 2,949,445, issued Aug. 16, 1960 to J. Blake. The lacquer film was dried and had a thickness of about 1.5 mil. The lacquer film was then coated with a barrier layer formed by charging into a reaction vessel and heating under a nitrogen blanket at 85 to 90° C. for six hours the following:

| | Parts |
|---|---|
| Methyl methacrylate | 40 |
| n-Hexyl methacrylate | 57 |
| Glycidyl methacrylate | 3 |
| Toluene | 33.3 |
| Isopropyl alcohol | 33.3 |
| $\alpha,\alpha'$-Azodiisobutyronitrile | 0.2 |

After 6 hours, 0.2 more part of $\alpha,\alpha'$-azodiisobutyronitrile was added to the reaction mixture and the heating continued for 3 more hours. The resulting solution was diluted with 71.7 parts of toluene and 161.7 parts of isopropanol. The solution at this point had a Brookfield viscosity of 0.65 poise using a No. 1 spindle at 6 r.p.m.

This solution was then charged to an autoclave and pressured with ammonia at 145 pounds per square inch gauge, and heated for 16 hours at 70° C. Ammonia was stripped from the reaction mixture by reducing the pressure thereon to 100 millimeters of mercury and holding the mixture at 40° C. at that pressure for 5 hours. The resulting polymer solution contained about 0.3% amino nitrogen.

The polymer solution was cut with an equal volume of a 1:1:1 mixture of methyl ethyl ketone, dimethyl ether, methyl alcohol, and sprayed on the dried unplasticized methyl methacrylate lacquer. A 5 mil film was formed.

The 5 mil barrier layer was then coated with reinforcing material by means of a roving gun as described in Example I, but this time a polymer-in-monomer solution of methyl methacrylate polymer dissolved in methyl methacrylate monomer, containing about 20% by weight polymer, (produced by the method set forth in British Patent No. 870,191, issued to Calkins et al. on Oct. 4, 1961) was employed. Both heads of the dual head roving gun sprayed a mixture of polymethyl methacrylate and 0.1 part per million parts of polymer-in-monomer solution of antimony trichloride—an initiator accelerator. The glass rovings had been previously treated with lauroyl peroxide by passing them through a 10% solution. A 100 mil film of this material was applied, compacted, and cured. The resulting article was uncrazed.

Example III

A molded sheet made by the process of Example I was painted by spraying on one surface with an unplasticized methyl methacrylate lacquer prepared as follows:

21.30 units of acrylic resin solution containing 40 units of polymethyl methacrylate, 30 units acetone and 70 units toluene, were mixed with 10.86 units acetone, 10.86 units Cellosolve acetate (B ethoxyethyl acetate) and 4.52 units of methyl ethyl ketone. 52.46 units of titanium dioxide was added to this mixture by sand grinding.

Twenty units of the above mixture was stirred into 48.2 units of an acrylic resin solution containing 40 units of polymethyl methacrylate, 30 units of acetone and 70 units of toluene, 21.8 units of methyl ethyl ketone and 10 units of toluene. This lacquer has a ratio of $TiO_2$/polymethyl methacrylate of 50/100.

This lacquer was further cut with a 2 to 1 mixture of methyl ethyl ketone and toluene to reduce the viscosity sufficiently to allow easy spraying.

The lacquer was then sprayed on the molded methyl methacrylate sheet. The lacquer film was dried at 150° F. for 60 minutes and had a thickness of about 2 mil.

A layer of nitrocellulose lacquer (unplasticized) was then applied to the dried methyl methacrylate lacquer by spraying. The nitrocellulose lacquer was prepared as follows:

10.42 units of a nitrocellulose solution having a viscosity of .5 second containing about 70% solids of nitrocellulose in isopropyl alcohol were mixed with 13.56 units of toluene, 5.89 units of cyclohexanone, 3.48 units of methyl ethyl ketone, 3.14 units of isopropyl alcohol, 9.29 units of acetone, 9.29 units of Cellosolve acetate (B ethoxyethyl acetate). 44.93 units of titanium dioxide pigment were dispersed in this mixture by sand grinding.

A separate solution containing 23.01 units of a nitrocellulose solution having a viscosity of .5 second containing about 70% solids nitrocellulose in isopropyl alcohol, 28.77 units of methyl ethyl ketone and 28.77 units of isopropyl alcohol were mixed together to form a clear solution. 19.45 units of the titanium dioxide containing nitrocellulose solution prepared above were then added to this solution. This gave a lacquer having a titanium dioxide to nitrocellulose ratio of 50/100. This lacquer was further reduced in viscosity as much as desired prior to spraying with a 1/1 mixture of methyl ethyl ketone and isopropyl alcohol. The lacquer was dried at 150° F. for 60 minutes, and formed a lamina of about 2 mil thickness.

The cellulose nitrate lacquer layer was then coated by spraying with a polyester-styrene mixture prepared as follows:

67.0 units of a commercially available polyester styrene solution containing about 60% of a low molecular weight polyester formed by the reaction of maleic anhydride, phthalic anhydride and ethylene glycol, in about 40% styrene monomer, was mixed with 25.0 units of aluminum silicate (filler) and 5.0 units styrene.

1.0 unit of benzoyl peroxide was then added to the above solution with vigorous stirring.

0.2 unit of N,N-dimethyl-p-toluidine which had been premixed with 1.8 units of styrene monomer was then quickly added to the stirred mixture. This mixture was then immediately used. The polyester-styrene layer was cured by baking at 150° F. for 60 minutes.

This polyester-styrene barrier layer was then sprayed in the manner set forth in Example I, with polyester-styrene and glass fibers. The polyester-styrene solution was the same as that set forth above. Glass fibers were present in the amount of about 30% by weight. The layer was compression rolled, and had a thickness of about 170 mil. The reinforcing layer allowed to cure for 8 hours at room temperature. The resulting laminate was free from crazing and withstood testing for 6 forty-eight-hour cycles consisting of alternate exposure to temperatures of 190° F. for 24 hours followed by −20° F. for 24 hours.

The term "polymethyl methacrylate" as used herein includes homopolymers as well as copolymers of methyl methacrylate and other acrylic monomers, such as for example, ethyl acrylate, and glycidyl methacrylate in which the other acrylic monomer is present to the extent of up to about 35% by weight of the composition. The polymethyl methacrylate may be stabilized with ultraviolet and thermal stabilizers.

The laminates of this invention may be rendered still more decorative by vacuum forming the polymethyl methacrylate sheet over a mold that has colored strips, such as polyethylene terephthalate coated with chromium on its surfaces. These strips will become embedded in the surface polymethyl methacrylate, and the back of these strips and the remaining portions of the polymethyl methacrylate may then be lacquered and coated as above described.

I claim:
1. A laminar construction comprising a lamina of polymethyl methacrylate, a lamina of reinforced resin spaced from said lamina of polymethyl methacrylate, a lamina of unplasticized polymethyl methacrylate lacquer bonded to said lamina of polymethyl methacrylate and a lamina of unplasticized nitrocellulose lacquer bonded to the lamina of unplasticized methyl methacrylate lacquer, said lamina of polymethyl methacrylate lacquer and said lamina of nitrocellulose lacquer being located between the lamina of polymethyl methacrylate and the reinforced resin.

2. The laminar construction of claim 1 in which the laminar construction also includes a barrier lamina located between the nitrocellulose lamina and the reinforced resin and which is bonded to each.

3. The laminar construction of claim 2 in which the barrier lamina located between the nitrocellulose lamina and the reinforced resin is selected from the class consisting of nylon, polyester-polystyrene mixture and polymethyl methacrylate.

4. The laminar construction of claim 3 in which the reinforced resin consists essentially of polyester-polystyrene mixture containing glass fibers.

5. The laminar construction of claim 3 in which the reinforced resin consists essentially of polymethyl methacrylate containing glass fibers.

References Cited

UNITED STATES PATENTS

| 2,640,817 | 6/1953 | Sheridan et al. | |
| 2,684,310 | 7/1954 | Prance et al. | |
| 2,825,672 | 3/1958 | Koblitz et al. | 161—254 X |

FOREIGN PATENTS

| 904,763 | 8/1962 | Great Britain. |

WILLIAM D. MARTIN, *Primary Examiner.*

R. HUSACK, *Assistant Examiner.*

U.S. Cl. X.R.

117—76; 161—254, 256